United States Patent
McNeece

[15] 3,657,507
[45] Apr. 18, 1972

[54] A VARIABLE SPEED CONTROL APPARATUS FOR USE WITH ELECTRICAL-DISCHARGE-MACHINING, THE CONTROL APPARATUS HAVING AN AUTOMATIC DISABLING FUNCTION

[72] Inventor: Leonard D. McNeece, Maywood, Ill. 60153

[22] Filed: Aug. 18, 1969

[21] Appl. No.: 850,775

[52] U.S. Cl..........................................219/69 G, 219/69 V
[51] Int. Cl...................................................B23p 1/14
[58] Field of Search ...................219/69 C, 69 R, 69 G, 69 V

[56] References Cited

UNITED STATES PATENTS 1,195,145   8/1916   Mattingly..........................219/69 V X
2,773,968   12/1956  Martellotti et al...................219/69 V
3,435,176   3/1969   Lobur...................................219/69 G Primary Examiner—R. F. Staubly
Attorney—John Todd, Walter I. Jones, Philip E. Parker, Gordon Needleman, James R. O'Connor and Joseph Y. Houghton

[57] ABSTRACT

An apparatus for use with an electric-discharge-machine for forming threads in an object wherein a thread tapping device is rotated with respect to the object while the material of the object is removed by electrical energy to define a mirror image of the contour of the tapping device, the apparatus being provided with automatic speed varying controls and reversing means to back the device out of the tapped opening when a short-circuit or near-short-circuit obstruction is encountered and to move it back into the opening when the obstruction is removed.

1 Claim, 5 Drawing Figures

PATENTED APR 18 1972

Inventor
Leonard D. M<sup>c</sup>Neece
By John Todd
Attorney

Inventor
Leonard D. McNeece
By John Todd
Attorney

A VARIABLE SPEED CONTROL APPARATUS FOR USE WITH ELECTRICAL-DISCHARGE-MACHINING, THE CONTROL APPARATUS HAVING AN AUTOMATIC DISABLING FUNCTION

The present invention relates to a thread forming apparatus and more particularly to an automatic thread forming apparatus adapted to control the feed of the thread tapping device associated with the apparatus.

Thread forming or tapping devices are commonly known in the art. Some devices are wholly mechanical in nature with cutting means being used to physically remove material to define the desired threaded conformation. Other devices, such as the type employed in the present invention, use electrical energy to remove material in defining the threaded conformation.

The particular device with which the apparatus of the present invention was employed was an electrical discharge machining device. Devices of this type depend for removal of materials upon the action of electrical energy in eroding a small portion of the surface of the material away from the main body of the material. The energy relationship is controlled such that the removal of material will follow the contour of the thread tapping device, or tool, which is used in the process. The energy relationship is adjusted to define a potential between the tool and the material which is controlled to assure removal of material only to a desired depth. The work is immersed in an oil bath, or the like, which constantly is circulated to provide means for carrying away particles removed from the material being worked upon.

Electrical discharge machining devices are commonly used for forming threads in steel or carbide material. Such materials commonly are difficult to machine and the use of such equipment is economical in machining very hard materials. The electrical discharge devices provide for economical, fast cutting of very hard materials some of which were impossible to machine prior to development of such devices.

One of the machines characterized as an electrical discharge machining device employs means to hand feed the thread tapping device to the piece being worked upon. It can readily be seen that hand feeding is slow, difficult work and requires the constant attendance of an individual at the machine to assure continuous operation in the thread tapping function of the device. It is readily recognized that hand tapping devices are very easy to set up quickly and if very little work is involved they commonly are more economical to employ than some of the sophisticated automatic feed tappers associated with EDM machines. Automatic feed tappers usually are difficult to set up and are time consuming so that the work to be done must be substantial before it becomes economical or advisable to use such tappers. Moreover, automatic devices commonly are expensive and difficult to use.

I have developed an automatic feed device for use with EDM machines, or the like, which can be set up in substantially the same time as the hand tapping devices but which does not require an attendant. Also, the automatic device which I have developed is adapted to disable the machine when the tapping operation is completed so that the attendant need not return to the machine until it is convenient for him to do so.

It is, accordingly, a primary object of the present invention to provide an improved automatic feed means for use with electrical energy material machining devices.

A further object of the present invention resides in the provision of an improved automatic feed device for use with electrical energy machining devices which will automatically control the speed of the thread tapping tool and which will automatically disable the machine upon completion of the tapping operation.

Additional objects of the present invention reside in the provision of an improved thread tapping device for use with machining tools using electrical energy to remove material from the piece being worked upon wherein the tapping device is provided with means to automatically withdraw the tapping tool from the piece being worked upon when a short-circuit or near-short-circuit obstruction is encountered and to feed the tool back into the piece when the obstruction is removed; and wherein the device is easy to set-up for use, is economical to manufacture and to use; is durable in use; provides control functions necessary for complete automatic operation of the machine and which is easy to understand in operation and control of the apparatus.

The novel features which I believe to be characteristic of my invention are set forth with particularity in the appended claims. My invention itself, however, together with further objects and advantages thereof will best be understood by reference to the following description taken in connection with the accompanying drawings, in which:

Figures 1, 2, 3, 4:
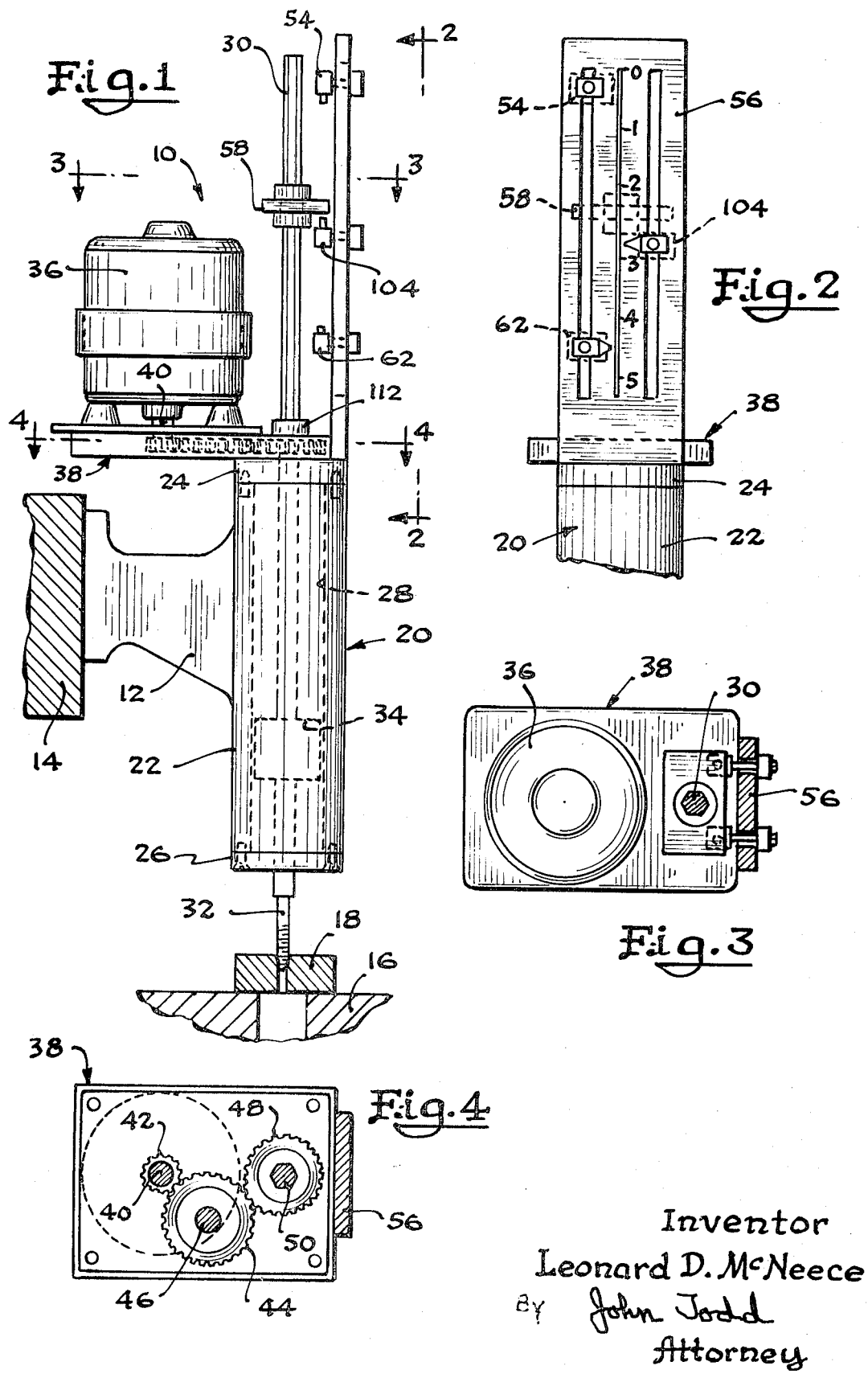
FIG. 1 is a side elevation of the apparatus of the present invention showing the control means and thread tapping device in their operative relationship.
FIG. 2 is a front view of a portion of the apparatus showing the control switches and front panel associated therewith for indicating the position of the thread tapping device with respect to the work piece and of the switch means associated therewith.
FIG. 3 is a fragmentary top view of the apparatus of FIG. 1 taken along lines 3—3 of FIG. 1 and showing the relative positions of the drive means and thread tapping device of the apparatus.
FIG. 4 is a sectional view of the apparatus of FIG. 1 taken along lines 4—4 of FIG. 1 and showing the speed reduction means and thread tapping device drive means associated with the apparatus.

Referring more particularly to the drawings, the apparatus is indicated generally at 10. The apparatus 10 is defined by a mounting bracket 12 which is supported by and secured to the housing 14 of the machine with which the feed apparatus 10 is associated. The machine is not illustrated in the drawings and is not a part of the present invention. The support table 16, which is not part of the present invention, is adapted to receive the piece 18 upon which work is to be done, as noted hereinbelow.

A generally tubular guide and support extension 20 is secured to the bracket 12 of the apparatus 10 and is defined by a generally elongated tubular body portion 22 having end caps 24 and 26 removeably secured to either end thereof, as illustrated in FIG. 1. The end caps 24 and 26 may be secured to the body section 22 by any convenient means suitable for this purpose.

The body section 22 defines a central opening 28 extending completely therealong. The end caps 24 and 26 are provided with central openings to permit the thread tapping drive element 30 to freely move therein.

An electrode 32 is secured to the lower terminal of the thread tapping drive element 30 and is provided with a threaded conformation along the length thereof. The electrode 32, of course, is non-rotatably secured with respect to the drive element 30 of the apparatus 10. It should be noted that in the embodiment specifically illustrated in the drawings the drive element 30 extends to and is drivingly connected to the guide thread tapping element securing member 34. The element 34 is guidingly received within the central opening 28 of the body 22 and is adapted for guided vertical movement within said opening. The thread electrode element 32 is adapted to be removeably secured to the guided element 34 to permit easy replacement of the electrode 32 during use of the apparatus. The thread tapping drive element 30 is drivingly associated with the guided element 34 to cause it to rotate with the element 30 thereby imparting rotational movement to the threaded element 32, as desired.

It should be noted that the apparatus extending from the upper end cap 24 downwardly involves a conventional hand fed tapping means which may be associated with an electrical discharge machining device. This portion of the hand tapping means is defined by the mounting bracket 12 and the guide and support extension 20 with its associated elements. The device which I have developed is adapted to be operatively associated with such a conventional hand tapping structure while still providing automatic tapping operation for the apparatus.

An electric motor 36 is associated with the apparatus 10 and is drivingly connected to the thread tapping drive element 30 through a speed reducing box indicated generally at 38. The output shaft 40 of the motor 36 is drivingly connected to first gear 42 of the speed reducing mechanism 38. The gear 42 is meshingly engaged with a second gear 44. As seen in FIG. 4 the output shaft 40 of the motor 36 extends into the first gear 42 and is non-rotatably associated therewith. The second gear 44 is rotatably mounted within the housing of the speed reducing means 38 by the shaft 46 associated with said second gear. The second gear 44 is meshingly engaged with a third gear 48. The third gear 48 of the speed reducing means 38 is provided with a hexagonal opening 50 in the center thereof to drivingly receive the thread tapping drive element 30 of the apparatus 10. Thus, the drive train is defined from the motor 36 through the output shaft 40 thereof, to the first gear 42 of the speed reducing means 38, the second gear 44 and to the third and drive gear 48 of the speed reducing means.

Figure 5:
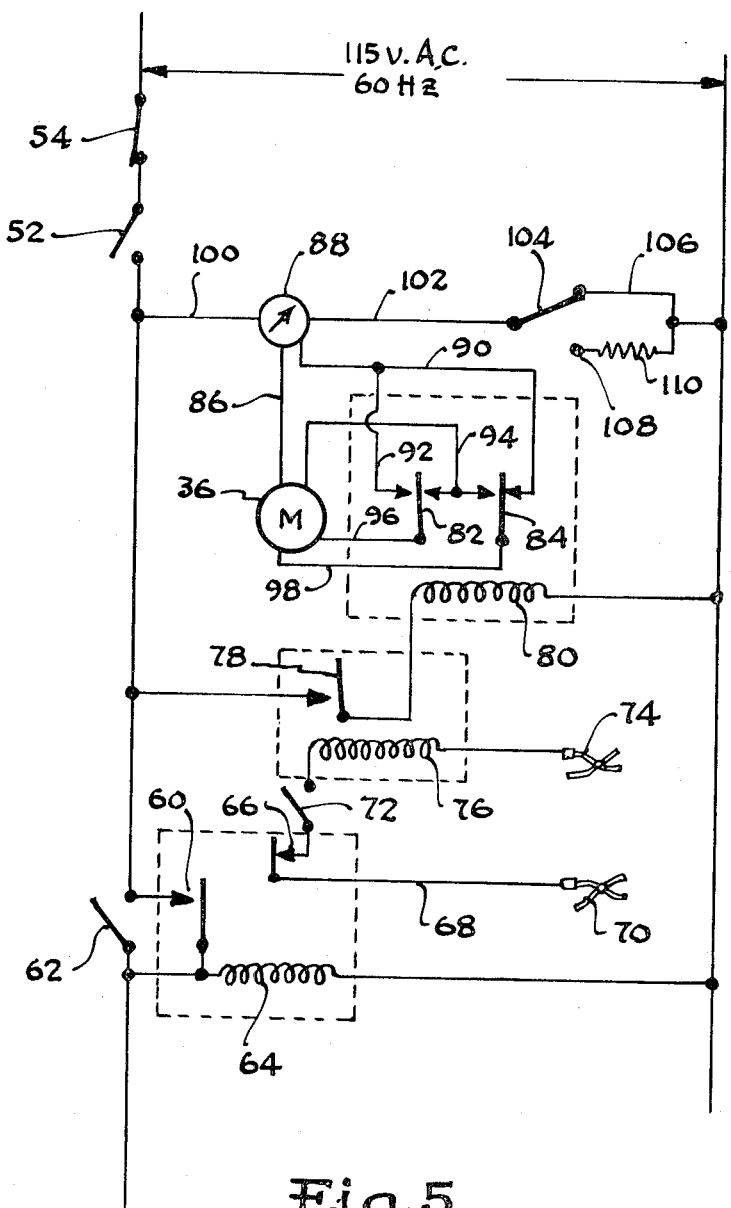
FIG. 5 is a schematic electrical diagram of the control means and associated apparatus of the present invention.

The electrical circuit and control means associated with the apparatus 10 may best be understood by reference to the schematic diagram of FIG. 5 in conjunction with the illustrative drawings of FIGS. 1 and 2.

The schematic is conventionally illustrated as connected to a 115 volt A.C., 60 Hertz source. An on-off switch 52 is positioned in one side of the 115 volt A.C. source to disable the circuit, as desired. An associated disabling switch 54 is positioned in one side of the circuit to interupt the power supply to the apparatus 10 and is shown in FIG. 1 as the top switch mounted on the support bracket 56. The disabling switch 54 is effective to terminate electrical power to the apparatus when the threading operation has been completed and the tapping device returned to the full reverse position where it will engage the switch 54 to terminate the machine function. A switch engaging collar 58 is rigidly secured to the extension of the thread tapping drive element 30 in any position desired by the user. The collar 58 is provided with a set screw to positionally orient said collar with respect to the general longitudinal axis of the drive element 30.

A second switch member 104 is mounted on the support bracket 56 in a pre-determined position thereon but is slideably oriented with respect to said bracket 56 to move with the collar 58 as noted below. When the switch element 104 is engaged by the lower face of the collar 58 the switch 104 will be carried down with the movement of the collar. However, if the apparatus reverses direction and the collar 58 is caused to move upwardly the switch element 104 will remain in the lower-most position to which it is carried by the downward movement of the collar 58 and will not follow the collar upwardly in the reverse direction of movement of the apparatus.

The third switch element 62 is mounted on the support bracket 56 and defines the lower limit of movement for the apparatus. The collar 58 is adapted to engage the switch element of the switch 62 when the collar has moved to a position adjacent said switch 62. The switch 62 is schematically illustrated on one side of the 115 volt A.C. source in FIG. 5 and is adapted to disable the circuit at the point indicated. A first relay coil 64 is connected across the 115 volt A.C. source through the switch 62 and the switch 60, as illustrated in the schematic diagram of FIG. 5. The relay coil 64 is adapted to control the function of the switch 66 which is connected to one lead 68 of the alligator clip 70 associated with the apparatus 10. A manually controlled switch 72 is provided in the circuit defined between the alligator clips 70 and 74 to provide a manual function for elevating the thread tapping electrode 32 of the apparatus, as noted in detail hereinbelow.

A second relay coil 76 is electrically connected between the switches 66 and 72 and the alligator clip 74. The second relay coil is adapted to control the function of the switch 78. One terminal of the switch 78 is connected to one side of the 115 volt A.C. power supply while the other terminal is connected to one lead of a third relay coil 80 the opposite lead which is connected to the other side of the 115 volt A.C. source. The third relay coil controls the function of switches 82 and 84 which are adapted to control the direction and speed condition of the electric motor 36. The motor 36 is provided with forward and reverse windings. One of the windings of the motor 36 is adapted to drive the output shaft of the motor in one direction, while the other winding of the motor 36 is adapted to drive the output shaft in the reverse direction from movement directed by the first winding.

One lead of one of the control windings of the motor 36 is connected through a lead 86 to one output terminal of a variable speed control member 88. The other output terminal of the variable speed control member 88 is connected through leads 90 and 92 to one terminal of the switch 82 and along the lead 92 to one terminal of the switch 84. The other terminals of the switches 82 and 84, respectively, are connected through lead 94 to one of the windings of the motor 36. The common terminal of the switch 82 is connected through lead 96 to one of the winding terminals of the motor 36 and the common terminal of switch 84 is connected through lead 98 to a terminal of one of the windings of the motor 36.

One of the input terminals of the variable speed control member 88 is connected through lead 100 to one side of the 115 volt A.C. power supply while the other terminal is connected through lead 102 to the common terminal of switch 104 of the apparatus. One terminal of the switch 104 is connected continuously through lead 106 to the other side of the 115 volt A.C. supply while the other terminal 108 is connected through a resistor element 110 to the other side of the 115 volt A.C. supply source.

In operation the apparatus 10 is placed in its support position on the body 22 through the end cap adaptor 24 associated with the apparatus. The speed reducing box 38, of course, is provided with a protective cover which serves as a mounting support plate for the motor and associated apparatus. The support bracket 56 may be secured to the cap 24 or to the protective cover for the speed reducing box 38, as desired. A guide and support collar 112 is provided on the cover for the gear reducing box 38 to receive the threaded tapping drive element 30.

The apparatus 10 may be held in position on the body 22 by suitable dowel pins or other securing means adapted for this purpose.

As noted hereinabove, the drive element 30 is slideably received within the hexagonal opening of the gear 48 so that the element 30 will be driven when the gear 48 rotates but will be free to slide vertically with respect to said gear.

The collar 58 is secured in position on the drive element 30 by a set screw, or other suitable means. Accordingly, the collar 58 is adapted to move along with vertical movement of the drive element 30 to define an aspect of the automatic control function defined herein.

The drive element 30 is not threaded but merely defines a shaft having a hexagonal outer shape in the illustration specifically set forth here. It should be observed, however, that a square shape or any other shape other than round may be used equally well to provide easy driving interaction between the shaft 30 and the drive gear 48. If a round shaft were to be used the shaft would necessarily have to be keyed to the gear 48 to provide the driving inter-relationship. Also, the shaft would necessarily have to be keyed to the guided element 34 to provide for a driving relationship between these two elements.

The vertical movement of the shaft 30, guided element 34 and threaded electrode 32 may be provided in several ways. One way is to have threaded means defined on the outer periphery of the element 34 in mating threaded relation with a threaded internal conformation in the central opening 28 of the body 22. This particular configuration, however, would not be desirable since it would limit the application of the apparatus in terms of feed rate for the device. Another configuration which is more suitable resides in the provision of a threaded conformation in the central opening of the end cap 26 which mates with the threaded conformation of the electrode 32. Thus, the particular threaded conformation of the apparatus may readily be changed to receive a different electrode configuration simply by changing end caps 26 to use the desired conformation.

It can readily be seen that as the drive element 30 is rotated to cause the element 34 to rotate the threaded electrode 32 will be threadably moved vertically up or down with respect to the end cap 26 to move the electrode 32 toward or away from the work piece 18, as desired. The direction of vertical movement, of course, will depend upon the direction of rotation of the drive element 30.

The automatic control means associated with the apparatus are defined, in part, by the switches 54, 104 and 62 mounted on the support bracket. In use, the apparatus 10 is operated to drive the electrode 32 down to the work piece 18. At this point the switch 104 is manually moved up along the support bracket 56 to a point where it engages the collar 58 of the apparatus to depress the switch and close the circuit defined by the switch 104 and contact 108 so that the resistor 110 is connected across the 115 volt A.C. power supply.

The switch 104 is adapted to control the high or low speed operation of the motor 36. When the switch 104 is not engaged by reason of the collar 58 being out of contact with said switch it will rest on the upper terminal (FIG. 5) to connect the power supply for the motor through the control member 88, lead 102, switch 104 and lead 106. When the collar 58 engages the switch 104 the resistor 110 will be included in the circuit and the circuit across the 115 volt A.C. power supply will be defined along lead 100 through the variable speed control member 88, lead 102, switch 104, terminal 108 and voltage dropping resistor 110 to the opposite side of the 115 volt A.C. power supply. This will, in effect, reduce the available voltage to the motor winding and cause a reduction in speed in direct relationship to a function of the voltage drop occurring as a result of the resistor 110 now being included in the circuit.

As noted above, the switch 104 is moved along the support bracket 56 to bring it into contact with the collar 58 when the threaded electrode 32 engages the upper surface of the work piece 18. This will bring into function the slow speed operation of the motor so that it will properly rotate to provide the appropriate speed necessary for the desired removal of material from the work piece to define the threaded configuration within the work piece 18. The speed may further be adjusted by control of the adjusting means on the variable speed control member 88 to change the actual speed of rotation of the output shaft 40 within the low or high speed ranges of the apparatus 10.

As the threaded electrode 32 continues to move into the work piece 18 is continues to remove the material from the work piece to define the threaded conformation within the work piece 18 which is a mirror image of the external conformation of the threaded element 32. When the desired depth has been reached, as determined by positioning of the switch 62 of the control apparatus, the collar 58 will engage the switch 62 to temporarily close it and connect the relay coil 64 across the 115 volt A.C. power supply. This brings in the holding switch 60 to define continuity of connection of the relay coil 64 across a power supply. When the relay coil 64 is energized the switch 66 will be closed energizing the coil 76, closing switch 78 and energizing the coil 80. This will move the switches 82 and 84 to the switch position defining a connection with the reverse winding of the motor 36 to cause the electrode member to begin to back-up out of the work piece 18. As this occurs the collar 58 will move out of engagement with switches 62 and 104 to again open the switch 62 and to move the switch 104 to the upper terminal (FIG. 5) to connect the motor 36 to its high speed relationship. In this manner the threaded electrode 32 is removed from the finished threaded opening with the work piece 18 rather rapidly. There is no need to remove it slowly since there is no obstruction and the mating thread opening already has been defined in the work piece 18. The relay coil 64 remains energized due to the holding switch 60 which defines a circuit continuity across the 115 volt A.C. power supply. The threaded electrode 32 continues to be withdrawn and moved out of the work piece 18. This action continues until the collar 58 engages the upper limit switch 54. This will open the switch 54 to define a circuit discontinuity and interrupt operation of the apparatus completely. The machine remains disabled until an attendant arrives to monitor its action and restore it to its operative condition. If the threaded opening has been defined in the work piece 18, then restoration of the apparatus to its operational condition will involve removal of that work piece and insertion of another for a subsequent operation.

The description noted above contemplates the smooth thread tapping operation in the work piece 18 without encountering a short-circuit or near-short-circuit obstruction or other impediment to continued operation of the threading action. This seldom occurs in a continuous operation since particles are always involved in the path of activity to cause a circuit discontinuity or other circuit interruption. In a hand operation this may be attended to only by slowly backing the threaded electrode 32 by hand, out of the work piece 18 to assure a free channel for removal of the obstruction from the partially defined threaded opening in the work piece 18. The electrode 32 then is moved, by hand, into the work piece 18 to reinstitute the threading action.

With my apparatus this is accomplished automatically. The alligator clips 70 and 74 are connected across the circuit defined in the apparatus with one clip being connected to any conductor electrically associated with the threaded tapping electrode 32 and the other clip being connected to any element electrically conductive and associated with the work piece 18. Thus circuit continuity is defined between the electrode 32 and the work piece 18. If a circuit dis-continuity occurs by reason of a short-circuit or near-short-circuit obstruction, or the like, the circuit through the coil 76 will be interrupted and the switch 78 will move to its open position to de-nergize the relay coil 80. This will move the switches 82 and 84 to connect the reverse winding of the motor 36 across the power supply thereby causing the threaded electrode 32 to be moved automatically out of the work piece 18 until the obstruction is cleared and the circuit is again defined between the threaded electrode 32 and the work piece 18. It can readily be seen that as the reversal occurs the collar 58 will move away from the switch 104 to take the voltage dropping resistor 110 out of the circuit and permit the motor 36 to operate at high speed. When the circuit is again defined between the threaded electrode 32 and the work piece 18 the coil 76 will be energized to move the switch 78 to closed position and energize the relay coil 80 moving switches 82 and 84 to the position where they electrically connect the forward direction winding of the motor 36. Since the collar 58 is still out of engagement with switch 104 the voltage dropping resistor 110 will not be in the circuit and the motor will continue to operate at its high speed level. As the collar moves to the work area it again will contact switch 104 closing it and moving it to bring the voltage dropping resistor 110 into the circuit and causing it to operate in its low speed condition.

While I have shown and described the specific embodiment of the present invention it will, of course, be understood that other modifications and alternative constructions may be used without departing from the true spirit and scope of this invention. I therefore intend by the appended claims to cover all such modifications and alternative constructions as fall within their true spirit and scope.

What I intend to claim and to secure by United States Letters Patent, is:

1. An apparatus for machining an object and control means therefor, comprising:
  a source of electrical energy;
  thread tapping machining means associated with said source of electrical energy;

a drive means associated with said energy source to cause the thread machining means to move in a programmed direction and at a programmed speed;

control means associated with said drive means, said control means including a first member (58) which moves in conjunction with and as a function of movement of the thread machining means to variably position itself during operation of the apparatus in accordance with the position of the thread machining means, a second member (54) defining a disabling switch to disable the apparatus when the thread machining means is in a retract position, a third member (62) defining means to retract the thread tapping means when the machining function is completed, a fourth member (104) movable with the first member (58) during operation of the apparatus said fourth member adapted to regulate the speed of the drive means to program it to a slow mode for machining, said fourth member remaining in position when the thread machining means reverses, the drive means adapted to operate in high speed mode when out of engagement with the fourth member and in low speed mode when in engagement with the fourth member, and means responsive to an overload condition in the apparatus to reverse the drive means when an obstruction is encountered in the work.

* * * * *